United States Patent [19]
Leini

[11] Patent Number: 5,845,402
[45] Date of Patent: Dec. 8, 1998

[54] CHAIN SAW GUIDE BAR WITH REPLACEABLE LIQUID-CONDUCTING TUBES

[75] Inventor: Arvo Leini, Edsbyn, Sweden

[73] Assignee: Sandvik AB, Sandviken, Germany

[21] Appl. No.: 761,973

[22] Filed: Dec. 11, 1996

[30] Foreign Application Priority Data

Sep. 30, 1996 [SE] Sweden ................................. 9603544

[51] Int. Cl.[6] ............................ B27B 17/02; A01G 23/08
[52] U.S. Cl. .............................. 30/123.4; 30/383; 83/169; 118/40; 144/4.8; 144/34.1; 401/137
[58] Field of Search ................................. 30/123.4, 383, 30/384, 387, 515; 83/169, 830; 118/40, 41; 144/34.1, 4.8, 336, 364, 380; 401/137; 437/289, 291

[56] References Cited

U.S. PATENT DOCUMENTS

| | | | |
|---|---|---|---|
| 4,352,241 | 10/1982 | Johansson | 30/123.4 |
| 4,981,129 | 1/1991 | Osterman et al. | 30/123.4 X |
| 5,050,303 | 9/1991 | Sinclair et al. | 30/123.4 |
| 5,056,224 | 10/1991 | Seigneur | 30/123.4 |
| 5,092,044 | 3/1992 | Edgerton et al. | 30/123.4 |
| 5,143,131 | 9/1992 | Seigneur et al. | 30/123.4 X |
| 5,426,854 | 6/1995 | Leini et al. | 30/123.4 |
| 5,564,484 | 10/1996 | Ketonen | 30/123.4 X |

FOREIGN PATENT DOCUMENTS 469 974  1/1989  Sweden .

*Primary Examiner*—Clark F. Dexter
*Attorney, Agent, or Firm*—Burns, Doane, Swecker & Mathis, L.L.P.

[57] ABSTRACT

A guide bar for a chain saw includes a pair of side plates and a center plate disposed therebetween. Each of the side plates includes spray holes through which a liquid can be sprayed. Liquid-conducting tubes are mounted in a longitudinal center slot of the center plate, and outlet ends of the tubes are connected to the spray holes of one of the side plates. Inlet ends of the tubes are connected to fittings mounted in a rear end of the guide bar to enable the tubes to receive liquid from a liquid source. A worn guide bar can be reversed, while still permitting the spraying to be performed. That is, while the guide bar is being reversed, the tubes are removed to enable the fittings to be reversed. Then, the inlet ends of the tubes are reconnected to the fittings, and the outlet ends of the tubes are connected to the spray holes formed in the other side plate.

7 Claims, 2 Drawing Sheets

CHAIN SAW GUIDE BAR WITH REPLACEABLE LIQUID-CONDUCTING TUBES

BACKGROUND OF THE INVENTION

The present invention relates generally to chain saws and, in particular to a saw chain guide bar used on a vehicle-mounted chain saw, the guide bar having channels for conducting a liquid such as paint.

When trees are felled and cut to logs of different lengths for producing saw timber or pulpwood, there is a need to indicate the proposed classification of the product by marking each log in a clearly visible manner to facilitate sorting. The classification is done while the tree is being cut, taking into account the tree species, the diameter, the length and the existence of knots or damage, as well as the need for different types of logs. The classification may depend on operator decisions as well as automatic measurements in a tree harvest machine.

According to Swedish patent SE 469 974 the marking can be done in a tree harvester having a vehicle-mounted chain saw, by providing the chain saw guide bar with internal channels through which paint or other marking fluid can be sprayed to the surface of wood cut by the saw chain.

By providing each channel with just one spray nozzle which opens through the guide bar surface, with the nozzles being offset lengthwise, it is possible to mark the cut wood surface with non-overlapping color streaks when the marking fluid is pressurized. When the fluid of a particular channel is not pressurized, no corresponding streak will be applied. In this way, two channels will permit four classifications, and three channels will permit eight classifications, presuming that each channel has a different marking color. If trees of greatly differing diameters are to be handled, it may be an advantage to provide each channel with two nozzles, to make two similar sets of color streaks, in order to make certain that at least one set traverses the cut surface.

The fluid sprayed from the nozzles could be stored in a pressurized state in vessels having openable valves, or the fluid could be in a non-pressurized state and then pressurized by metering pumps at the time of spraying. It is also possible to have a common transfer medium (i.e., of one color), with different marking pigments added thereto at a location close to the chain saw guide bar.

Each marking fluid channel of the guide bar is connected to a channel extending from the vehicle through the guide bar holder, with swivels or flexible elements being provided to allow marking fluid to be supplied while the chain saw is cutting through the tree trunk.

Previously known guide bars for use in marking have been provided with spray nozzles on one side only, and have thus not been reversible when one guide bar edge has been worn.

SUMMARY OF THE INVENTION

The present invention relates to a guide bar adapted for use in a chain saw, the guide bar being able to spray from one side, and then from an opposite side after being reversed. The guide bar comprises a plate structure, and a plurality of liquid conducting tubes. The plate structure includes first and second side plates, and a center plate disposed therebetween. The first side plate includes a longitudinal center slot and first liquid spray holes. The second side plate includes a longitudinal center slot and second spray holes. The center plate includes a longitudinal center slot. The tubes are disposed in the center slot of the center plate, the tubes having outlets communicating with respective ones of the spray holes disposed in the first side plate, so that spraying of liquid occurs through the first side plate. The plate structure is reversible about its longitudinal center axis, and outlet ends of the tubes are removable from the first spray holes and reconnectable with the second spray holes after the plate structure has been reversed, so that spraying occurs through the second side plate.

Preferably, fittings are mounted at inlet ends of respective tubes, each fitting including an open end for receiving a supply of liquid through one of the first and second side plates. The fittings are reversible when the plate structure is reversed, so that the liquid is supplied through the other of the side plates.

BRIEF DESCRIPTION OF THE DRAWING

A preferred embodiment of a chain saw guide bar according to the invention will be described with reference to the figures, wherein.

DETAILED DESCRIPTION OF A PREFERRED EMBODIMENT OF THE INVENTION

Figure 1:
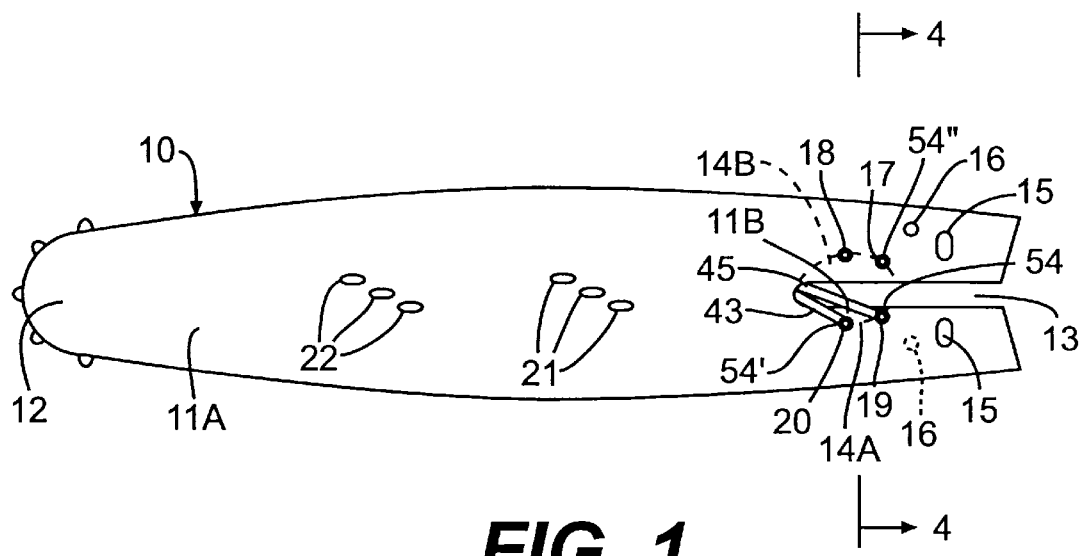
FIG. 1 shows an exterior side view of a guide bar side plate according to the invention.

A guide bar (10) is of the laminated type, comprising two side plates 11A, 11B joined to a center plate (31) by welding or brazing. As shown in FIG. 1, each side plate has a nose end (12), and a rear end with a bolt slot (13) for receiving clamping bolts holding the guide bar. The front of the bolt slot has a widening (14A or 14B) extending towards one side. The widenings (14A and 14B) extend in different respective directions. That is, the widening (14A) of the side plate (11A) extends downwardly in FIG. 1, and the widening (14B) of the other side plate (11B) extends upwardly and is hidden in FIG. 1. Adjacent to the bolt slot are two through holes (15) for receiving adjustment lugs which locate the guide bar in the longitudinal direction, and an oil supply hole (16) to receive and convey lubricating oil to the saw chain. Opposite to the widening (14A) in the side plate (11A) there are liquid supply holes (17,18), and through the widening (14A) the corresponding liquid supply holes (19,20) of the other side plate (11B) are visible in FIG. 1. In the middle region of the guide bar there is one or more groups of spray holes (21,22), the spray holes in each group being longitudinally separated.

Figure 2:
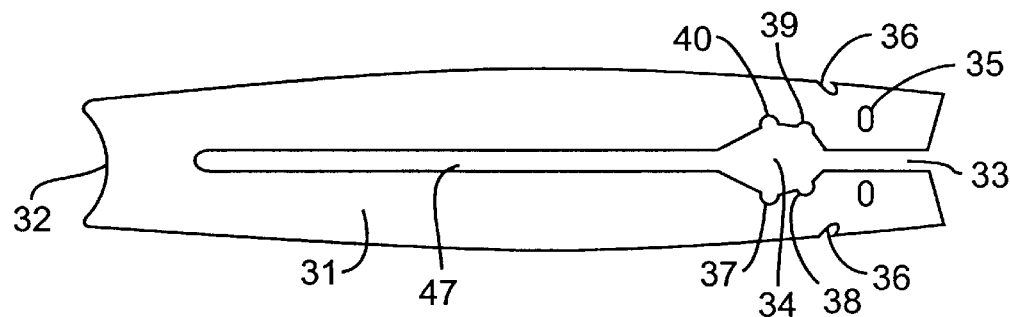
FIG. 2 is a side view of the center plate of the guide bar of FIG. 1.
Figure 4:
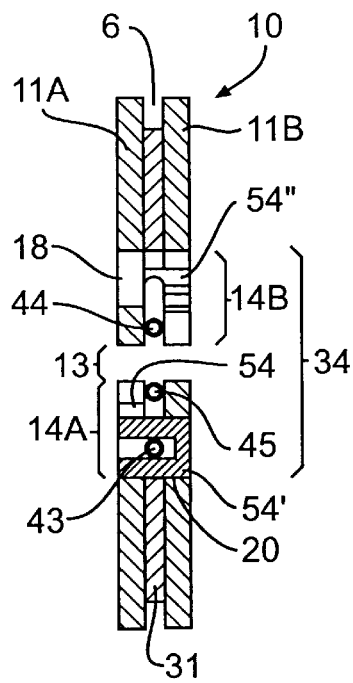
FIG. 4 a sectional view through the guide bar.
Figure 7:
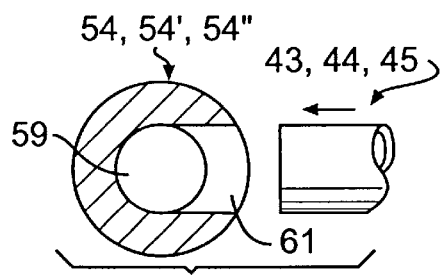
FIG. 7 is a sectional view taken along line 7—7 in FIG. 6.
Figure 6:
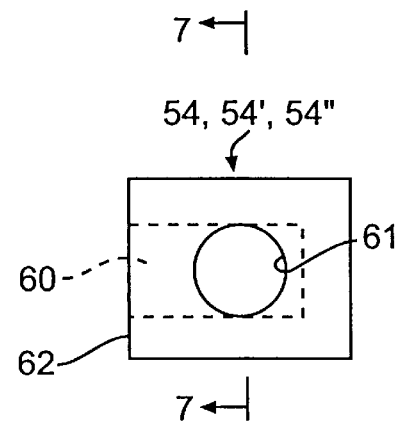
FIG. 6 is a side view of a fitting according to the invention.
Figure 5:
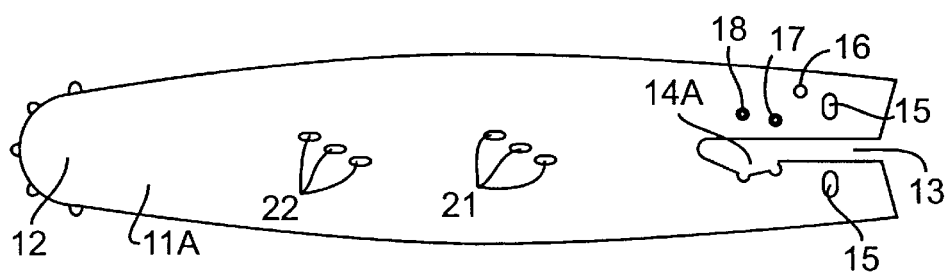
FIG. 5 shows a side view of one of the side plates.

The center plate (31) shown in FIG. 2 is generally narrower in width than the side plates, to create a chain groove G extending around the outer periphery of the guide bar for guiding a saw chain when the center plate has been joined to the two side plate (see FIG. 4). In the center plate (31) there are provided: (i) a bolt slot (33) corresponding to the slots (13) in the side plates, and (ii) a large symmetric widening (34) corresponding to both of the widenings (14A, 14B) of the side plates, i.e. the widening (34) extends to both sides of the slot (33) and includes notches (37, 38, 39, 40) in positions corresponding to the liquid supply holes (17, 18, 19, 20) in the respective side plates. The slot (33) has a forward extension slot (41) extending somewhat farther towards the front than the spray hole groups (21,22). There are two through holes (35) in the center plate aligned with the holes (15) of the side plates for receiving the adjustment lugs (not shown). At the edge of the center plate there are two notches (36) each forming an oil channel associated with one of the air supply holes (16) to conduct oil the bottom of the chain groove.

Figure 3:
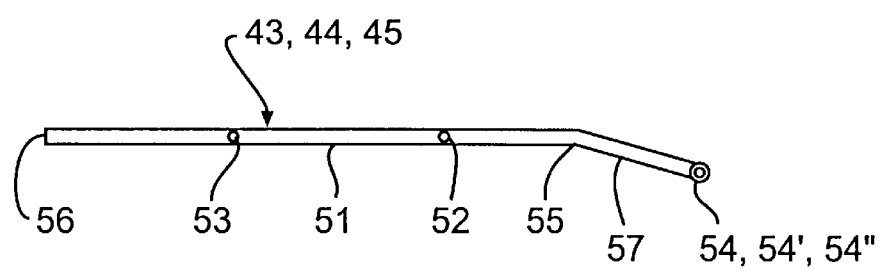
FIG. 3 is a side view of a tube withdrawn from the guide bar.

FIG. 3 shows a lining tube (43 or 44 or 45) separated from the guide bar. The tube comprises a thin-walled tube of soft metal such as brass, and has a straight front section (51) formed with nozzle holes (52,53) that are spaced apart by the same distance as the spray hole groups (21,22). If there is only one spray hole group (21 or 22), the tube will have only one nozzle hole (52 or 53). The front end (56) of the tube is sealed by compression or by soldering. The rear part (57) of the tube is bent slightly to one side at (55). At least the straight section (51) between the front end (56) and the bend (55) must have an exterior thickness not greater than the thickness of the center plate (31). At the extreme rear, the tube is attached to a fitting (54) shaped as a cylindrical sleeve with a diameter larger than that of the tube. Since in some operations it would be sufficient to use only one of the groups of spray holes (21,22) it may be advantageous to sell lining tubes having no nozzle holes or having plugged nozzle holes, and let the user drill out the appropriate nozzle holes.

When assembled and ready for use, a number of lining tubes equal to the number of spray holes in each group (21,22) is inserted in the forward extension slot (41), the width of the slot being chosen so that the tubes fit snugly. In the depicted embodiment which employs three spray holes in each group, there would be three lining tubes. The nozzle holes (51,52) of the tubes will then be located inside corresponding spray holes (21,22), which are larger than the nozzle holes so that they support the tubes but do not interfere with the paint spray. Each of three tubes (43, 44, 45) is connected to a respective fitting (54', 54", 54) located near the rear of the guide bar. Note that there is no tube leading to the supply hole 18 in the depicted embodiment, although there could be one if desired. As shown in FIG. 4, the tube fitting (54') has one of its ends mounted in the supply hole 20 formed in the side plate 11B to secure the tube (43) in a longitudinal direction, and the other end is located in the widening (14A) of the other side plate (11A). The intermediate part of the fitting (54') and the adjoining rear part of the tube (43) is located in the large widening (34) of the center plate. In fact, the rear parts of all of the tubes are located in that widening (34). The fitting (54) is mounted in the side plate (11B), whereas the fitting (54") is mounted in the side plate (11A).

According to the invention, the lining tubes can be easily removed and replaced in the guide bar when needed. This is done for many different reasons. If a marking fluid channel has been obstructed by dirt particles or dried paint, the lining tubes can be removed and replaced by new or cleaned tubes. If other marking colors are to be used for a certain operation, the old lining tubes should be replaced by new ones to avoid the mixing of old and new marking fluid. If the guide bar has been unsymmetrically worn, it should be reversed by being turned around a longitudinal axis and the tubes removed and replaced in the new position. If a guide bar has been deformed and needs straightening, this is best done while the tubes are removed.

It will be appreciated that the spraying is done from a selected one of the sides of the guide bar. The present invention enables the guide bar to be reversed, while enabling the spraying to be performed from the opposite side of the guide bar. Assume for example, that the spraying has been done from the side plate (11A). Eventually, the guide bar can be reversed by being turned about its longitudinal axis in order to compensate for wear. Then, the spraying can be done from the other side plate (11B) by removing the tubes and reversing the fittings so that the open ends (60) of the fittings are disposed in the side plate (11A) rather than in the side plate (11A). The tubes are reattached so that their outlet ends are connected to the spray openings 21, 22 of the other guide bar 11B, and so that their inlet ends are connected to respective ones of the fittings (which have been reversed). Thus, even though the guide bar has been reversed, spraying can still be performed.

When a lining tube is to be removed from the guide bar, the associated tube fitting is pushed from the round hole (20). The straight front section (51) of the tube is then rotated in the slot extension (41) while the rear part (57) of the tube is raised within the widenings (34 and either 14A or 14B). The tube can be withdrawn through the slots (13, 33). The tube can afterwards be reinserted into the slots by reversing the above steps and then rotating the tube to engage the fitting.

Each fitting (54, 54', 54") is cup-shaped and has a longitudinal bore (59) open at one end (60) to receive marking fluid from the guide bar holder. A lateral hole (61) in the fitting receives one of the tubes (43, 44, 45). The end surface should preferably be wide enough to form a leak-proof seal with a soft sealing element (not shown) recessed in the guide bar holder. If all tube fittings are on the same side of the guide bar center line, as is usually the case with two tubes, all open ends penetrate round holes, and the sealing element may then form a seal wholly or partly with the side plate surface around the hole. If it is desired to make the guide bar slightly slidable relative to the holder by moving the lugs engaging the through holes (15) in order to adjust the chain tension, one way to secure a good seal is to make the fitting have a sliding fit in the respective hole of the side plate and with a centering element having conical or cylindrical surfaces to keep it aligned with the seal element of the guide bar holder. When the chain saw is in position to fell a tree, the open cup end should preferably be upward, and the nozzle holes downward.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed:

1. A guide bar for use in a first position in a chain saw, comprising:

a first side plate including a longitudinal center slot and a first plurality of liquid spray holes;

a second side plate including a longitudinal center slot and a second plurality of spray holes;

a center plate disposed between the first and second side plates, and including a longitudinal center slot; and a plurality of liquid-conducting tubes disposed in the center slot of the center plate, the tubes having outlet ends communicating with respective ones of the spray holes disposed in the first side plate, so that spraying of liquid occurs through the first side plate;

wherein said first, second and center plates define a plate structure of said guide bar, the plate structure being rotatable about a longitudinal center axis thereof for use of said guide bar in a chain saw in a second position, the outlet ends of the tubes being removable from the first plurality of spray holes and connectable to the second plurality of spray holes after the plate structure has been rotated, so that spraying occurs through the second side plate; and wherein the longitudinal slot of the center plate includes a widening extending laterally in two opposite lateral directions, the longitudinal slot of the first side plate includes a widening extending in one lateral direction, and the longitudinal slot of the second plate includes a widening extending in a lateral direction which is opposite to said one lateral direction.

2. The guide bar according to claim 1, further comprising fittings mounted at inlet ends of each tube of said plurality of tubes, each fitting being mounted in said plate structure and including an open end for receiving a liquid, said liquid being supplied through a respective liquid supply hole in one of the first and second side plates, the fittings being removably mounted in said plate structure so that when the plate structure is rotated, each fitting is repositioned so that the liquid is supplied through a respective liquid supply hole in the other of the side plates.

3. The guide bar according to claim 2 wherein each fitting is cup-shaped.

4. The guide bar according to claim 3 wherein each fitting is removably mounted in the corresponding liquid supply hole in one of the first and second side plates through which the liquid is received.

5. The guide bar according to claim 2 wherein each fitting is removably mounted in the corresponding liquid supply hole in one of the first and second side plates through which the liquid is received.

6. The guide bar according to claim 1 wherein each tube includes a rear portion disposed in the center slot of the center plate, the rear portion being bent with respect to a front portion of the tube to enter the widening of the center slot.

7. The guide bar according to claim 1 wherein the first plurality of spray holes includes longitudinally spaced groups of first spray holes, each tube including a plurality of outlets, each outlet of each tube connected to one of the first spray holes in a respective one of said groups, the second plurality of spray holes of said second side plate including groups of second spray holes corresponding in location to the groups of first spray holes.

* * * * *